United States Patent Office 3,428,630
Patented Feb. 18, 1969

---

3,428,630
PYRAZOLYL DERIVATIVES HAVING OPTICAL WHITENING PROPERTIES
Asim Kumar Sarkar, Adel, Leeds, England, assignor to Hickson & Welch Limited, Castleford, Yorkshire, England, a British company
No Drawing. Filed Nov. 29, 1965, Ser. No. 510,407
Claims priority, application Great Britain, Dec. 8, 1964, 49,925/64
U.S. Cl. 260—240.9
Int. Cl. C09b 23/14
5 Claims

ABSTRACT OF THE DISCLOSURE

There are provided compounds of the formula

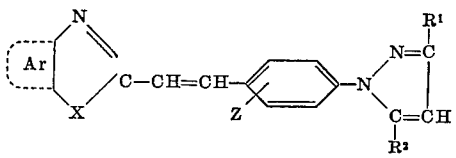

in which Ar represents an aromatic ring system which may for example be derived from benzene or naphthalene and may if desired be substituted by one or more substituents such as for example halogen (e.g., chlorine) atoms or alkyl, alkoxy or cyano groups; X represents an oxygen or sulphur atom; or a group of formula —NR— wherein R represents a hydrogen atom; an alkyl group (either unsubstituted or substituted, e.g. by a halogen atom or by a hydroxy, carboxy, alkoxy or cyano group); a group of formula —COR³ (wherein R³ represents a substituted or unsubstituted alkyl group or an aryl group); or a group of formula —SO₂R⁴ (wherein R⁴ represents an aryl group); Z represents a hydrogen or halogen atom, or an alkyl or alkoxy group; and R¹ and R², which may be the same or different, each represents a hydrogen atom or an alkyl or aryl group. The compounds are useful as optical whitening agents.

---

This invention is concerned with new chemical compounds of use as optical whitening agents especially for the whitening and/or brightening of cellulosic (e.g., cotton) and polyamide (e.g., nylon) fibres.

Optical whitening agents have in recent years found extensive use in the treatment of textile fibres, both in their preparation and during washing, and are designed in general to counteract the yellow or off-white colour which white textiles may develop. Such optical whitening agents also tend to improve coloured textiles as they impart a general brightness to them.

The present invention is based upon the discovery of certain new pyrazolyl derivatives having optical whitening properties which are non-ionic, which are stable to hypochlorite, and which have good substantivity to both cellulosic and polyamide fibres, the said derivatives having favourable fluorescent properties with good uptake on to the fibres from aqueous (e.g., detergent) solutions over a wide temperature range.

According to one feautre of the present invention, therefore, there are provided new compounds of the general formula:

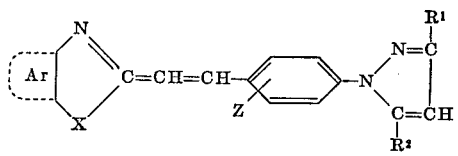

in which Ar represents an aromatic ring system which may for example be derived from benzene or naphthalene and may if desired be substituted by one or more substituents such as for example halogen (e.g., chlorine) atoms or alkyl, alkoxy or cyano groups;

X represents an oxygen or sulphur atom; or a group of formula —NR— (wherein R represents a hydrogen atom; an alkyl group either unsubstituted or substituted, e.g., by a halogen atom or by a hydroxy, carboxy, alkoxy or cyano group); a group of formula —COR³ (wherein R³ represents a substituted or unsubstituted alkyl group or an aryl group); or a group of formula —SO₂R⁴ (wherein R⁴ represents an aryl group);

Z represents a hydrogen or halogen atom, or an alkyl or alkoxy group; and

R¹ and R², which may be the same or different, each represents a hydrogen atom or an alkyl or aryl group.

According to a further feature of the invention, there is provided a method of treating textile fibres, particularly cellulosic or polyamide fibres, which comprises applying to the said fibres at least one compound according to the invention as hereinbefore defined.

In compounds of the Formula I the group

can for example be a group of formula

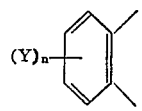

in which Y represents a halogen (e.g., chlorine) atom or an alkyl, alkoxy or cyano group and n is 0 or an integer from 1 to 4, preferably 0, 1 or 2. Where Y represents an alkyl or alkoxy group, it preferably represents such a group containing from 1 to 4 carbon atoms, e.g. a methyl or methoxy group.

Z preferably represents a hydrogen or halogen atom; in the latter case the halogen atom is advantageously a chlorine atom.

In particularly preferred compounds according to the invention, at least one of R¹ and R² represents a lower alkyl group containing from 1 to 4 carbon atoms, e.g. a methyl group, or a phenyl group. Where X represents the group —NR—, R can for example with advantage represent a substituted or unsubstituted alkyl group containing from 1 to 4 carbon atoms, e.g. such a group substituted by a hydroxy or carboxy group, for example a β-hydroxyethyl or β-carboxyethyl group; or a group of formula —COR³ in which R³ represents an alkyl group containing from 1 to 4 carbon atoms, e.g. a methyl group. In general halogen atoms in the compounds of Formula I are preferably chlorine atoms; any alkyl and alkoxy groups are preferably such groups containing from 1 to 4 carbon atoms; and any aryl groups are preferably phenyl groups.

For the purpose of treating textile fibres in general, the compounds according to the invention may advantageously be incorporated into compositions comprising at least one compound according to the invention together with a solid or liquid carrier. Such compositions may, for example, be adapted for use in the washing of finished cellulosic or polyamide fibres, and can take the form of aqueuos solutions or suspensions of compounds according to the invention containing in addition for example synthetic detergents, soaps or surface active agents. Thus, we have found that a good whitening effect on nylon may be achieved when a compound according to the invention is applied from an aqueous detergent solution at 40° C. The compounds according to the invention may be applied to polyamide fibres from a neutral, acidic or alkaline aqueous solution. Moreover, the compounds according to the invention can be applied to cellulosic fibres from a cationic aqueous solution. Where the above mentioned compositions include a solid carrier, this may for example comprise a solid synthetic detergent or soap.

The compounds according to the invention may be prepared by any convenient method, but are advantageously prepared by a process according to the present invention which comprises reacting a hydrazino compound of the formula

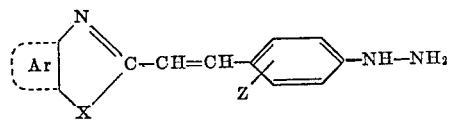
II (wherein Ar, X and Z are as hereinbefore defined) with a compound of formula:

$$R^1—CO—CH_2—CO—R^2 \quad III$$

(wherein $R^1$ and $R^2$ are as hereinbefore defined). The reaction is preferably effected at elevated temperatures, conveniently at the reflux temperature of the reaction medium, preferably at acid pH in the presence of an organic solvent. A suitable reaction medium is for example aqueous acetic acid.

The hydrazino compounds of Formula II used as starting materials for the process according to the invention may for example first be prepared by diazotisation and subsequent reduction of compounds of formula:

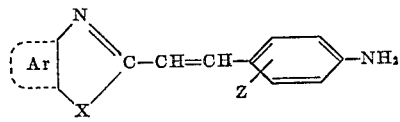
IV (wherein Ar, X and Z are as hereinbefore defined). The reduction may conveniently be effected using reducing agents already known to be useful for reduction of diazo compounds to hydrazino compounds. The preparation of compounds of Formula IV has for example been described in British patent specification No. 996,240.

Where compounds of Formula I (in which X represents —NH—) are first prepared, such compounds may be converted to further compounds of Formula I (i.e., compounds of Formula I in which X represents —NR— and R is other than hydrogen). Thus, for example, compounds of Formula I in which X represents

can be prepared by reaction of the corresponding compound of Formula I in which X represents —NH— with an acetylating agent such as acetic anhydride.

In order that the invention may be well understood the following examples (in which all parts are by weight) are given by way of illustration only:

EXAMPLE 1

Preparation of 2-[4'-(3",5"-dimethylpyrazol-1"-yl) styryl]-5-methylbenzimidazole

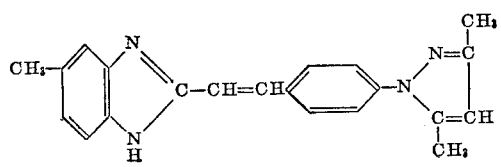

2 (4'-aminostyryl)-5-methylbenzimidazole (5 parts) is dissolved in 75 parts of glacial acetic acid, the mixture cooled to room temperature with stirring and 40 parts of concentrated hydrochloric acid are added. The mixture is cooled to 0° C. and 1.5 parts of sodium nitrate dissolved in 10 parts of water are added. The mixture is then stirred for 45 minutes at 0° C., following which 10 parts of stannous chloride dissolved in 10 parts of concentrated hydrochloric acid and cooled to 0° C. are added. The reaction mixture is then maintained at 0° C. for one further hour. The mixture is then diluted with 250 parts of ice cold water, stirred and filtered. The precipitate thereby obtained is washed with dilute hydrochloric acid, slurried in water and the slurry made alkaline with sodium hydroxide. The mixture is then filtered and the precipitate washed with cold water.

The hydrazino compound thus obtained is dissolved in 300 parts of 80% aqueous acetic acid and the solution cooled to room temperature. To this solution 2 parts of acetylacetone are added, and the temperature of the mixture is gradually raised to the reflux temperature during 2 hours. Refluxing is continued for one further hour, and the mixture is then diluted with water and the pH adjusted to 10 with caustic soda solution. The mixture is filtered and the precipitate thus separated is washed thoroughly with water. The crude product is crystallised from 100–120° C. petroleum ether. $E_1^1$=1397 at 348 m$\mu$, M.P.=100–110° C. with shrinkage at 90° C.

EXAMPLE 2

Preparation of 1-acetyl-2-[4'-(3",5"-dimethylpyrazol-1"-yl)styryl]-5-methylbenzimidazole

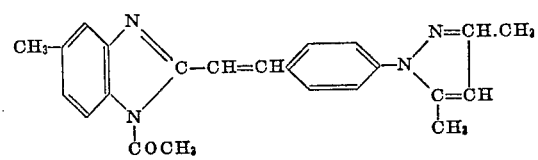

1 g. of the product of Example 1 is refluxed with excess acetic anhydride for 3 hours. The mixture is treated with water, made alkaline with ammonia, and cooled. The mixture is then filtered and the precipitate dissolved in benzene and dried over calcium chloride. The benzene is then evaporated off and the solid so obtained is crystallised from a mixture of benzene and petroleum ether. $E_1^1$=1266 at 348 m$\mu$.

EXAMPLE 3

Preparation of 2-[4'-(3",5"-dimethylpyrozol-1"-yl)styryl]-5-methylbenzoxazole

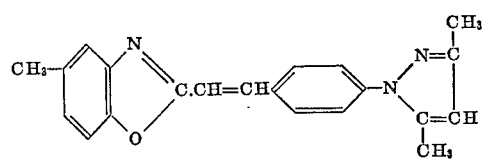

The method described in Example 1 is repeated using 2-(4'-aminostyryl)-5-methylbenzoxazole instead of 2-(4'-aminostyryl)-5-methylbenzimidazole as starting material. The product has an $E_1^1$=1314 at 340 m$\mu$, M.P.=135–137° C.

The following compounds have been prepared by a method analogous to Example 1:

| Ex. | Formula | $E_1^1$ | $\lambda_{max.}$, m$\mu$ | M.P., °C |
|---|---|---|---|---|
| 4 | CH₃-benzoxazole-C-CH=CH-C₆H₄-N(pyrazoline with phenyl, CH₃) | 1,188 | 344 | 152-4 |
| 5 | benzimidazole(NH)-C-CH=CH-C₆H₄-N(pyrazoline with CH₃, CH₃) | 1,400 | 341 | 168-70 |
| 6 | benzimidazole(NH)-C-CH=CH-C₆H₄-N(pyrazoline with phenyl, CH₃) | Crude product not purified. | | |
| 7 | benzothiazole-C-CH=CH-C₆H₄-N(pyrazoline with CH₃, CH₃) | 1,314 | 346 | 107-8 |
| 8 | benzothiazole-C-CH=CH-C₆H₄-N(pyrazoline with phenyl, CH₃) | 1,035 | 345 | 143-4 |
| 9 | naphthoxazole-C-CH=CH-C₆H₄-N(pyrazoline with CH₃, CH₃) | 1,088 | 359 | 97-100 |
| 10 | CH₃O-benzimidazole(NH)-C-CH=CH-C₆H₄-N(pyrazoline with CH₃, CH₃) | 1,760 / 1,006 | 357 / 357 | 95-100 / 214-6 |
| 11 | H₃C,H₃C-benzimidazole(NH)-C-CH=CH-C₆H₄-N(pyrazoline with CH₃, CH₃) | 1,244 | 354 | 132-150 |
| 12 | H₃C,H₃C-benzimidazole(N-COCH₃)-C-CH=CH-C₆H₄-N(pyrazoline with CH₃, CH₃) | 966 | 350 | 285-95 |
| 13 | Cl-benzimidazole(NH)-C-CH=CH-C₆H₄-N(pyrazoline with CH₃, CH₃) | 1,215 | 347 | 125-6 |

| Ex. | Formula | $E_1^1$ | $\lambda_{max}$, m$\mu$ | M.P., °C |
|---|---|---|---|---|
| 14 | | 940 | 347 | 95–105 |
| 15 | | 1,080 | 352 | 207–8 |
| 16 | | 1,076 | 347 | 118–9 |
| 17 | | 1,052 | 350 | 134–6 |
| 18 | | 576 | 346 | 165–70 |

EXAMPLE 19

An aqueous bath is prepared containing 0.2 gm./litre of 2-[4'-(3",5" - dimethylpyrazol-1"-yl)styryl]-5-methyl benzimidazole.

In use, nylon fabric is treated in the bath for half-an-hour at 40° C., the liquor ratio being 1:40. The nylon thus treated is subsequently rinsed and dried and is then much whiter than prior to the treatment. Similar results are obtained from treating cotton fabric in the same way.

I claim:

1. A compound of the formula

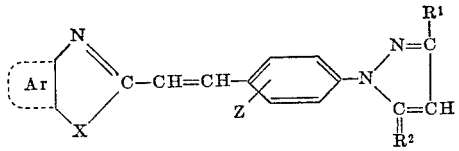

wherein

is an aromatic ring system derived from a member selected from the group consisting of benzene, naphthalene and said member substituted with at least one radical selected from the group consisting of halo, alkyl of from 1 to 4 carbon atoms, alkoxy of from 1 to 4 carbon atoms and cyano; X is a member selected from the group consisting of —O—, —S— and —NR— wherein R is a member selected from the group consisting of H, hydroxy-substituted alkyl of from 1 to 4 carbon atoms, carboxy-substituted alkyl of from 1 to 4 carbon atoms, and —COR³ wherein R³ is a member selected from the group consisting of alkyl of from 1 to 4 carbon atoms and phenyl; Z is a member selected from the group consisting of H, halo, alkyl of 1 to 4 carbon atoms and alkoxy of 1 to 4 carbon atoms; R¹ is a member selected from the group consisting of H and alkyl of from 1 to 4 carbon atoms; and R² is a member selected from the group consisting of H, alkyl of from 1 to 4 carbon atoms and phenyl.

2. A composition according to claim 1 in which

is an aromatic ring system derived from a member selected from the group consisting of benzene and benzene substituted with at least one radical selected from the group consisting of halo, alkyl of from 1 to 4 carbon atoms, alkoxy of from 1 to 4 carbon atoms and cyano.

3. A compound according to claim 1 in which R² is phenyl.

4. A compound according to claim 1 in which X is —NR— wherein R is a member selected from the group consisting of hydroxy-substituted alkyl of from 1 to 4 carbon atoms and carboxy-substituted alkyl of from 1 to 4 carbon atoms.

5. A compound selected from the group consisting of 2-[4'-(3",5"-dimethylpyrazol-1"yl)styryl] - 5 - methylbenzimidazole, 1-acetyl-2-[4'-(3",5"-dimethylpyrazol-1"-yl)-styryl]-5-methylbenzimidazole, and 2 - [4'-(3",5"-dimethylpyrazol-1"-yl)-styryl]-5-methylbenzoxazole.

References Cited

UNITED STATES PATENTS 2,974,141  3/1961  Plue _____ 260—240.9
2,833,779  5/1958  Fields et al. _____ 260—310

HENRY R. JILES, *Primary Examiner.*

H. I. MOATZ, *Assistant Examiner.*

U.S. Cl. X.R.

117—33.5; 252—301.3